United States Patent [19]

Szücs et al.

[11] 4,009,229
[45] Feb. 22, 1977

[54] APPARATUS FOR HEAT- AND MASS TRANSFER BETWEEN LIQUIDS AND GASES

[75] Inventors: László Szücs; Csaba Tasnádi; István Lindner, all of Budapest, Hungary

[73] Assignee: Patentbureau Danubia, Budapest, Hungary

[22] Filed: July 31, 1975

[21] Appl. No.: 600,650

Related U.S. Application Data

[63] Continuation of Ser. No. 435,985, Jan. 23, 1974, abandoned.

[52] U.S. Cl. .............................. 261/72 R; 261/112; 261/DIG. 11
[51] Int. Cl.² .......................................... F28C 1/00
[58] Field of Search ................. 261/111, 112, 72 R, 261/110, 114 R, DIG. 11; 55/249, 241

[56] References Cited

UNITED STATES PATENTS

| 1,905,422 | 4/1933 | Rasmussen | 261/DIG. 11 X |
|---|---|---|---|
| 2,316,461 | 4/1943 | Teichner | 261/112 |
| 2,398,345 | 4/1946 | Cooper | 261/114 R |
| 2,795,288 | 6/1957 | Hirs | 261/110 |
| 3,317,197 | 5/1967 | Lohner et al. | 261/112 X |
| 3,416,775 | 12/1968 | Szucs et al. | 261/112 |
| 3,742,681 | 7/1973 | de Seversky | 261/112 X |
| 3,743,256 | 7/1973 | Oplatka | 261/112 X |
| 3,795,388 | 3/1974 | Tóth | 261/112 |
| 3,803,997 | 4/1974 | van Raden | 261/114 R X |

*Primary Examiner*—Frank W. Lutter
*Assistant Examiner*—William A. Cuchlinski
*Attorney, Agent, or Firm*—Ernest F. Marmorek

[57] ABSTRACT

An apparatus for use in transferring heat and mass, having a receptacle for a liquid with a pile lock and a liquid distributor surface onto which the pile lock supplies a film of the liquid. The distributor surface faces downwards and liquid withdrawing means act to withdraw the film of liquid from the surface and carry it to an outlet means. The heat and mass transfer takes place on the liquid withdrawing means.

7 Claims, 5 Drawing Figures

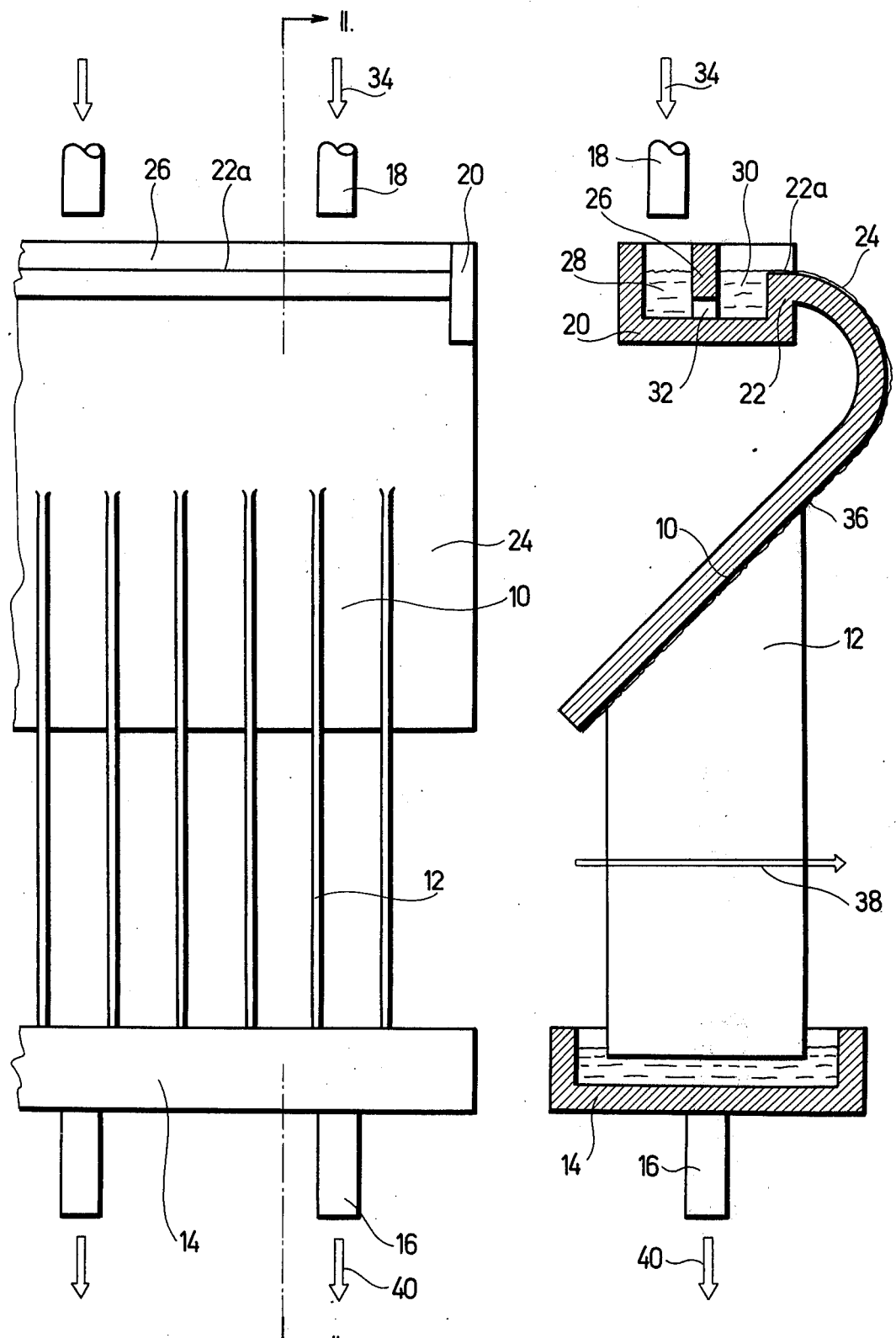

APPARATUS FOR HEAT- AND MASS TRANSFER BETWEEN LIQUIDS AND GASES

This is a continuation of application Ser. No. 435,985, filed Jan. 23, 1974, now abandoned.

The invention relates to apparatus for heat- and mass transfer between fluids such as liquids and gases.

As is known, heat- and mass transfer takes place whenever flow materials contact each other directly. The heat- and mass transfer is, among other things, the more efficient the greater the contact surface between the contacting media. Thus, for instance, cooling water in wet cooling towers is, possibly evenly distributed, supplied to large surface units of the cooling tower on which the cooling water flows downwardly in the form of a thin film under the action of gravity and is cooled down by contact with flowing air. Such cooling tower unit is described e.g. in Hungarian patent specification No. 154,201. The basic feature of the known apparatus consists in that a liquid distributor surface for forming a liquid film is provided between a liquid inlet and a liquid outlet, with said liquid distributor surface facing said liquid outlet. The liquid distributor surface has liquid withdrawing means connected to it one behind the other which lead from the liquid distributor surface to the liquid outlet so that portions of the liquid supplied through the liquid inlet which do not evaporate and, therefore, will not withdraw in the form of vapours (mass transfer) will withdraw through the liquid outlet in a cooled down state (heat transfer). Wires, bands, rods, plates etc. may be used for liquid withdrawing means which will be wetted by the downwardly flowing liquid in the form of thin films. Such features are responsible for the advantageous properties of the surface units.

If, however, the liquid reaches the liquid distributor surface in the form of a free ray coming from a tube as is the case with the known device according to the aforesaid patent specification, the liquid supply tubes have to be necessarily in front of the liquid withdrawing means by which the space beneath the liquid supply tubes remains unexploited and, thereby, the space requirement of the apparatus becomes unnecessarily increased. Practical experiences show that the total space requirement of the known apparatus amounts to one and a half to two and a half of a space requirement in which the liquid distributor surface and the liquid withdrawing means could be accommodated.

Furthermore, the thickness and the velocity distribution of the liquid film is substantially uneven if e.g. in case of a free ray having circular or rectangular cross-sectional area the liquid ray is injected and strikes against the liquid distributor surface in a concentrated manner whereby the forming of even liquid films is ab ovo rendered impossible. The unevenness of the liquid film will be even worse due to spraying and eddying caused by the impact of the liquid ray on the liquid distributor surface.

Moreover, the forming of a free injected ray requires essential flow velocities which can be obtained only in case of liquid supply tubes of very small free cross-sectional areas. Such tubes, however, are then liable to be blocked by deposits.

In order to obviate such concentrated impacts it has been suggested to employ a flat tube or a slit the transverse size of which equals to that of the liquid distributor surface. Then, however, the outlet openings are so narrow that premature fouling becomes inevitable. The main consequence of fouling is again an unevenness of the liquid film.

The main object of the present invention is the elimination of the aforesaid deficiencies and the provision of an apparatus for heat- and mass transfer between fluids such as liquids and gases with which, on the one hand, the liquid supply is accommodated within a vertical projection of the liquid withdrawing surface and, on the other hand, wetting of the liquid distributor surface is obtained by trickling (statically) rather than by injecting (dynamically). By the first expedient, it is ensured that the space requirement of the apparatus will be the least. The second expedient results in a liquid film of even thickness and velocity.

The basic idea of the invention is that a liquid which flows downwardly over a pile lock along the breadth of the liquid distributor surface, may be supplied to the latter beneath the pile lock under the action of surface tension and gravity. Accordingly, the invention is concerned with an apparatus for heat- and mass transfer between fluids such as liquids and gases with which, in a manner known per se, a film forming liquid distributor surface is provided between a liquid inlet and a liquid outlet, with said liquid distributor surface facing said liquid outlet and having liquid withdrawing means connected to it which are suitable for conducting the liquid from the liquid distributor surface to the liquid outlet. The essence of invention consists in that the liquid inlet consists of a liquid tank with a pile lock therein, an at least partly curved surface for conducting the liquid from said liquid tank to said liquid distributor surface being connected to said pile lock. It will be seen that the invention permits to obtain a relatively compact design of the apparatus in addition to an even thickness and velocity of the liquid film since there are no supply tubes which could be blocked by fouling.

Preferably, the liquid tank is subdivided by a partition upstream the pile lock into an inlet part and an outlet part, inlet part and outlet part being connected with one another beneath the partition. Such arrangement considerably increases the flow evenness as will be hereinafter explained in greater details.

Furthermore, the curved surface may consist of sections which are parallel to the pile lock and which enclose distances of maximum 5 millimeters. By such expedient the mounting of the apparatus is considerably facilitated.

Moreover, the curved surface may comprise breaks, an expedient by which both machining and mounting of the apparatus becomes more simple. The break angle, however, must not be smaller than $2b/3$ radians since, otherwise, the liquid film may part with the wetted surface.

The apparatus may be provided with a liquid tank having a pair of oppositely arranged pile locks, connected each by means of an at least partly curved surface with one liquid distributor surface, the liquid distributor surfaces forming a mirror like arrangement. Such embodiment is distinguished by relatively high efficiency.

Further details of the invention will be described by taking reference to the accompanying drawings which show, by way of example, several embodiments of the apparatus according to the invention and in which:

FIG. 1 shows a front view of a first exemplified embodiment.

FIG. 2 represents a sectional view taken along the line II—II of FIG. 1.

Same reference characters refer to similar details throughout the drawings.

Figure 3:
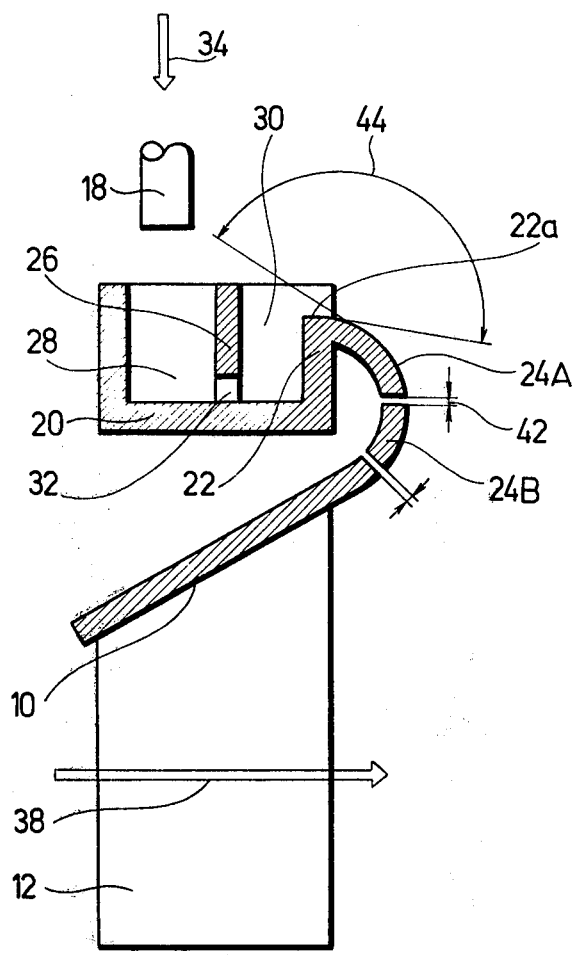
FIG. 3 illustrates a sectional view of another exemplified embodiment similar to FIG. 2.

In the drawing, FIGS. 1 and 2 show an exemplified embodiment of the apparatus according to the invention which is, in a manner known per se, provided with a film forming liquid distributor surface 10 which has liquid withdrawing means in the form of plates connected to it. One of the liquid withdrawing means is referred to by reference character 12. The liquid withdrawing surface 10 faces a tray 14 which is placed beneath the liquid withdrawing means and is provided with an outlet stud 16. In the instant case, tray 14 and its outlet stud 16 represent a liquid outlet 14, 16 of the device. The liquid withdrawing means 12 lead into the liquid outlet 14, 16, without, however, reaching the bottom of tray 14.

The liquid is supplied through distributor tubes one of which is referred to by reference character 18. Beneath the distributor tubes 18 there is place, in compliance with the invention, a liquid tank 20 which, in the instant case, represents a liquid inlet of the apparatus.

One side of the liquid tank 20 is formed by a pile lock 22 the crown 22A of which is, in compliance with the main feature of the invention, connected with the liquid distributor surface 10 by means of a curved surface 24. With the represented exemplified embodiment, the curved surface 24 is connected with both the crown 22A of the pile lock and the liquid distributor surface 10 without breaks.

Furthermore, with the represented embodiment, the liquid tank 20 comprises — upstream the pile lock 22 — a partition 26 which subdivides the chamber of the liquid tank 20 in an inlet portion 28 and an outlet portion 30. Both portions 28 and 30 are connected with one another beneath the partition 26. In the instant case, connection is obtained by a passage 32.

In operation, a liquid such as cooling water is supplied in a direction indicated by arrow 34 through the distributor tubes 18 into the inlet portion 28 of the liquid tank 20. Its upper layer performing undulatory and turbulent motion is held back by the partition 26. However, its bottom layer reaches the outlet portion 30 of the liquid tank 20 through the passage 32 at even flow so that the quiet upper water layer in outlet portion 30 flows over the pile lock 22 at even flow onto the curved surface 24 and from here to the film forming liquid distributor surface 10 where a water film 36 is formed.

The water film 36 is disintegrated on the liquid distributor surface 10 by the liquid withdrawing means 12 which conduct it from the liquid distributor surface 10 into the tray 14. Meanwhile, the disintegrated water film 36 is contacted by transversely flowing air along the surfaces defined by the water withdrawing means 12 so that heat and mass transfer take place while the water is cooled down and the air is warmed up and carries off evaporated portions of the water.

Cooled down water collects in the tray 14 wherefrom it withdraws through the outlet stud 16 in the direction of an arrow 40 for being reused as cooling water.

The exemplified embodiment shown in FIG. 3 differs from the previous one in that its curved surface is composed of sections 24A and 24B which are confined by generatrices which lie parallel to the pile lock 22 and enclose narrow slits. One of the slits is indicated by reference numeral 42. The breadth of the slits 42 amounts at most to 5 millimeters since, otherwise, the water layer would part with its carrying surface. As has been said above, such arrangement results in various advantages as regards manufacturing and mounting. A further preferable feature consists in that the curved surface 24A, 24B may comprise breaks 44 as in the instant case whereby, on the one hand, the dimension in the direction 38 (i.e. the "depth" of the device) is reduced and, on the other hand, technological and mounting requirements could be mitigated. However, care has to be taken that the break 44 should not be less than $2\pi/3$ radians since, otherwise, — as has likewise been mentioned — the water film 36 will be torn off the liquid distributor surface 10 by centrifugal and gravitational forces.

Figure 4:
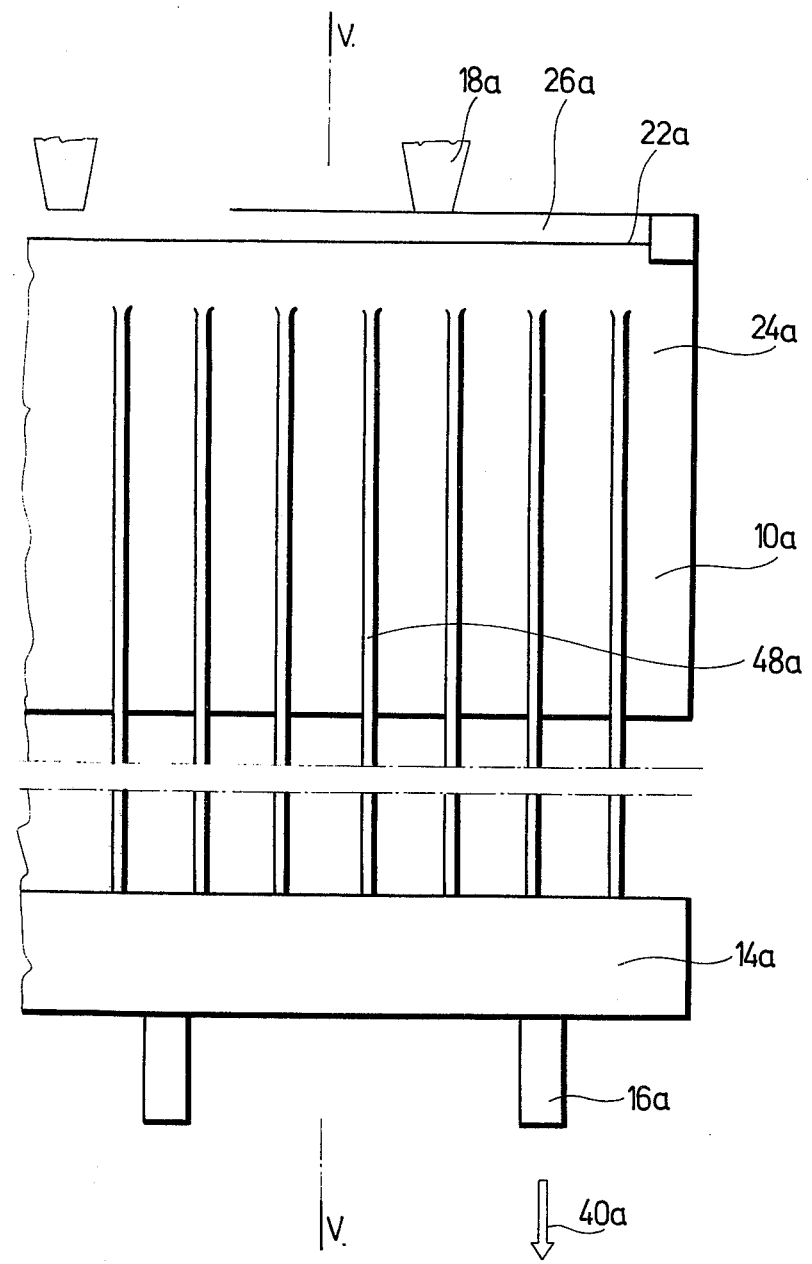
FIG. 4 is the front view of still another exemplified embodiment.
Figure 5:
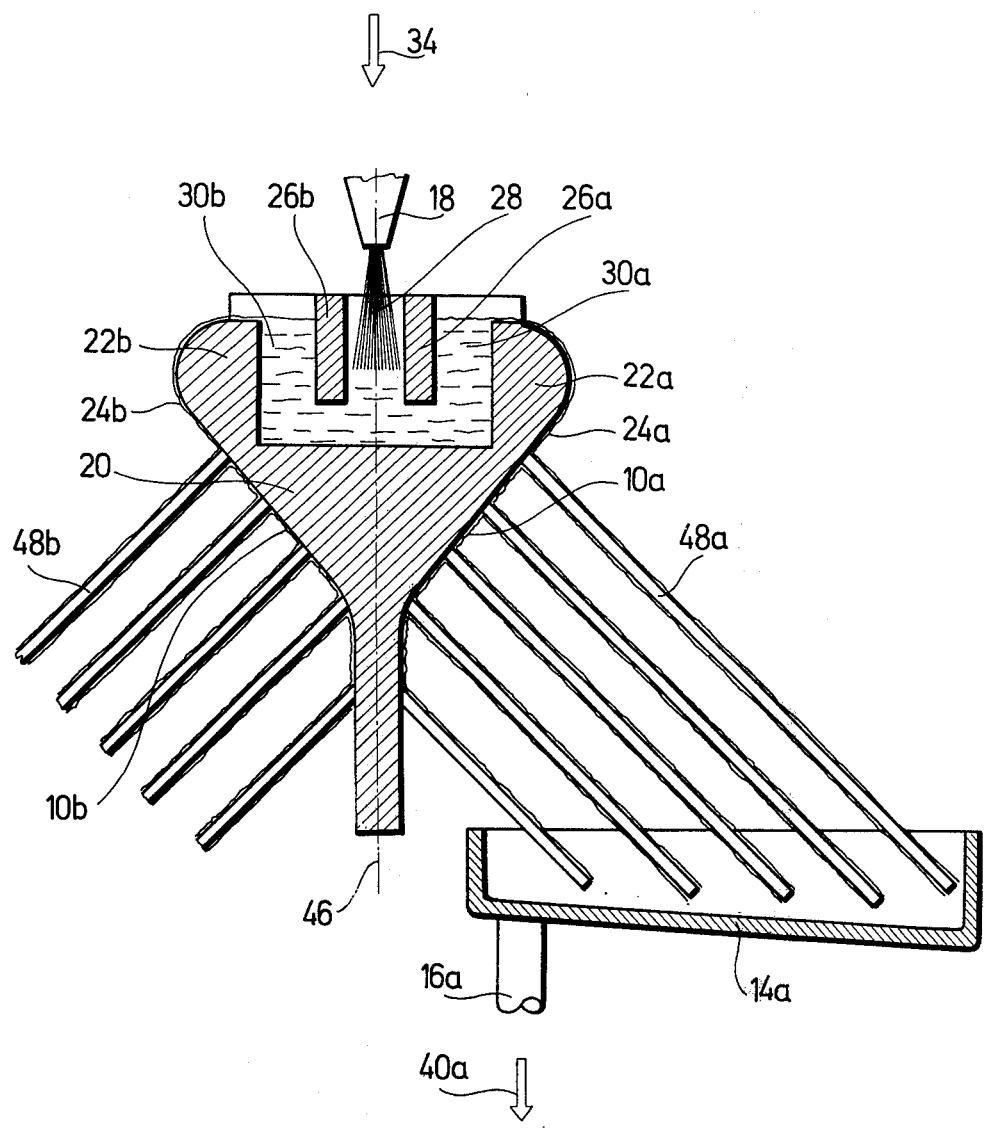
FIG. 5 shows a sectional view taken along the line V—V of FIG. 4.

FIGS. 4 and 5 illustrate an exemplified embodiment in mirror arrangement where twin parts are distinguished from one another by affixes $a$ and $b$, respectively, of the corresponding reference character. It will be seen that the liquid tank 20 is provided with a pair of mutually opposite pile locks 22a and 22b each of which has a curved surface 24a and 24b with liquid distributor surfaces 10a and 10b, respectively, connected to it. The aforesaid parts of the device occupy positions with respect to a vertical middle plane 46 mutually corresponding positions. In the instant case, the liquid withdrawing means are rods or sticks 48a and 48b rather than plates.

The exemplified embodiment just described operates in the same manner as the previously described one. However, its specific performance amounts practically to the double value of the performance of single sided embodiments and its significance lies in such increased performance.

What we claim is:

1. In an apparatus, for use in transferring heat and mass, in combination
   a receptacle for receiving, holding and discharging liquid,
   a pile lock in said receptacle operable to guide in film form liquid discharged from said receptacle,
   distributing means defining a liquid film distributor surface having a first curved portion and extending from said pile lock, and a second portion extending from said first portion and facing downwards,
   an outlet means, and
   liquid withdrawing means extending below said second portion and being operable for withdrawing liquid from said second portion and discharging it into said outlet means,
   said distributing means being connected to said pile lock and establishing an uninterrupted guide for said liquid film extending from said receptacle to said liquid withdrawing means.

2. In an apparatus, as claimed in claim 1, further comprising
   a partition means disposed in said receptacle whereby said receptacle is divided into at least one inlet portion and at least one discharge portion,
   said partition means defining a conduit therethrough, below the level of the liquid discharged from said receptacle.

3. In an apparatus, as claimed in claim 2, said partition means dividing said receptacle into two discharge portions, each said portion having an associated pile lock, distributing means and liquid withdrawing means.

4. In an apparatus as claimed in claim 1, each of said liquid withdrawing means comprising rods.

5. An apparatus, as claimed in claim 1, said second portion substantially facing said outlet means.

6. In an apparatus, for use in transferring heat and mass, in combination
- a receptacle for receiving, holding and discharging liquid,
- a pile lock in said receptacle operable to guide, in film form, liquid discharged from said receptacle,
- means defining a liquid film distributor surface having a first curved portion and extending from said pile lock, and a second portion extending through an area below said receptacle,
- said first curved portion further comprising sections which lie parallel to said pile lock which sections may be spaced apart by not more than 5 millimeters,
- an outlet means, and
- liquid withdrawing means extending below said second portion and being operable for withdrawing liquid from said second portion and discharging it into said outlet means.

7. In an apparatus, for use in transferring heat and mass, in combination
- a receptacle for receiving, holding and discharging liquid,
- a pile lock in said receptacle operable to guide in film form liquid discharged from said receptacle,
- means defining a liquid film distributor surface having a first curved portion and extending from said pile lock, and a second portion extending through an area below said receptacle,
- breaks defined in said first curved portion,
- said breaks having break angles of no less than $2\pi/3$ radians,
- an outlet means, and
- liquid withdrawing means extending below said second portion and being operable for withdrawing liquid from said second portion and discharging it into said outlet means.

* * * * *